US011505488B2

(12) United States Patent
Feigenblum

(10) Patent No.: US 11,505,488 B2
(45) Date of Patent: Nov. 22, 2022

(54) GLASS FORMING DEVICE AND METHOD

(71) Applicant: ROCTOOL, Le Bourget du Lac (FR)

(72) Inventor: José Feigenblum, Saint Paul (FR)

(73) Assignee: ROCTOOL, Le Bourget Dulac (FR)

( * ) Notice: Subject to any disclaimer, the term of this patent is extended or adjusted under 35 U.S.C. 154(b) by 828 days.

(21) Appl. No.: 15/561,067

(22) PCT Filed: Mar. 24, 2016

(86) PCT No.: PCT/EP2016/056685
§ 371 (c)(1),
(2) Date: Sep. 24, 2017

(87) PCT Pub. No.: WO2016/151127
PCT Pub. Date: Sep. 29, 2016

(65) Prior Publication Data
US 2018/0057389 A1     Mar. 1, 2018

(30) Foreign Application Priority Data
Mar. 24, 2015   (FR) ...................... 15 52470

(51) Int. Cl.
*C03B 23/025* (2006.01)
*C03B 40/02* (2006.01)
(Continued)

(52) U.S. Cl.
CPC ...... *C03B 23/0258* (2013.01); *C03B 23/0235* (2013.01); *C03B 23/0252* (2013.01); *C03B 23/035* (2013.01); *C03B 25/025* (2013.01); *C03B 40/00* (2013.01); *C03B 40/02* (2013.01); *C03B 2215/06* (2013.01); *C03B 2215/07* (2013.01); *C03B 2215/66* (2013.01); *C03B 2225/02* (2013.01)

(58) Field of Classification Search
CPC ..................... C03B 23/0258; C03B 23/0235
See application file for complete search history.

(56) References Cited

U.S. PATENT DOCUMENTS 5,713,979 A  *  2/1998  Nicholson ........... C03B 19/1453
                                                        65/424
2007/0267405 A1    11/2007  Feigen-Blum et al.
(Continued)

FOREIGN PATENT DOCUMENTS

FR    2 991 902 A1   12/2013
JP    S62 202828 A    9/1987
(Continued)

*Primary Examiner* — Erin Snelting
(74) *Attorney, Agent, or Firm* — C. Andrew Im; Jean-Christophe Hamann

(57) ABSTRACT

A tooling for forming a sheet of glass includes a forming die made of electrically conductive material and a heating unit, distant from the forming die. The forming die includes a molding surface, a support to hold a sheet of glass away from and opposite the molding surface, and an induction circuit having an inductor extending in a cavity in the forming die. The heating unit includes a surface configured to produce thermal radiation opposite the molding surface, and an induction circuit having an inductor extending in a cavity of the heating unit. A connector connects the induction circuits to a high-frequency current generator.

12 Claims, 1 Drawing Sheet

(51) Int. Cl.
    *C03B 40/00*     (2006.01)
    *C03B 23/023*    (2006.01)
    *C03B 23/035*    (2006.01)
    *C03B 25/02*     (2006.01)

(56) References Cited

U.S. PATENT DOCUMENTS

| | | |
|---|---|---|
| 2010/0000259 A1 | 1/2010 | Ukrainczyk et al. |
| 2012/0128809 A1* | 5/2012 | Guichard ............... H05B 6/105 |
| | | 219/618 |
| 2012/0297828 A1 | 11/2012 | Bailey et al. |
| 2013/0125888 A1 | 5/2013 | Monterenzi |
| 2014/0157828 A1 | 6/2014 | Dannoux et al. |
| 2015/0151471 A1 | 6/2015 | Feigenblum et al. |
| 2015/0165665 A1 | 6/2015 | Guichard et al. |
| 2015/0329402 A1* | 11/2015 | Afzal .................. C03B 23/0235 |
| | | 65/348 |
| 2016/0032482 A1* | 2/2016 | Nouri ..................... C30B 11/02 |
| | | 65/83 |

FOREIGN PATENT DOCUMENTS

| | | |
|---|---|---|
| JP | H10 218630 A | 8/1998 |
| WO | 2012/118612 A1 | 9/2012 |
| WO | 2013/190020 A1 | 12/2013 |
| WO | 2015/022643 A1 | 2/2015 |

\* cited by examiner

GLASS FORMING DEVICE AND METHOD

RELATED APPLICATIONS

This application is a § 371 application from PCT/EP2016/056685 filed Mar. 24, 2016, which claims priority from French Patent Application No. 15 52470 filed Mar. 24, 2015, each of which is incorporated herein by reference in its entirety.

FIELD OF THE INVENTION

This invention relates to a device and method for thermoforming glass.

The invention is more particularly but not exclusively dedicated to the forming of a sheet of glass for making a display screen.

BACKGROUND OF THE INVENTION

Throughout the document, the terms 'forming' and 'thermoforming' applied to glass refer to a method consisting in making a sheet of glass that is initially in the solid state follow another shape, without displacing sections of said sheet to a large distance. Thus, the method according to the invention does not for example relate to the forming of an object out of a gob by blowing or by centrifuging, which methods involve displacing sections of the initial object to a great distance.

The glass thermoforming method is known in the prior art and consists in heating a sheet of glass to be formed to a temperature that is sufficient for making it formable, that is to say a temperature above the glass transition temperature but below the melting temperature of the glass, which makes it possible to reach viscosity between $10^{11}$ and $10^7$ poises ($10^{10}$ to $10^6$ Pa·s). Thus heated to temperature generally ranging between 700° C. and 800° C., the sheet is made to follow the shape of tooling, generally a die, under the effect of gravity, pressure, a companion tool such as a punch, or by any combination of those means. Then the formed sheet is cooled using a cooling process where both the cooling speed and the spatial uniformity of the cooling are controlled, in order to achieve the internal state of stress to be achieved in the item thus formed, depending on its application.

The document US 2010/000259 describes a forming process consisting in placing a flat sheet of glass at a temperature below its softening temperature on pre-heated tooling. The tooling and the sheet are then heated in a furnace, particularly by infrared radiation. The sheet of glass is made to follow the shape of the tooling when its temperature is such that its viscosity is approximately $10^9$ poises ($10^8$ Pa·s). Then the assembly is removed from the furnace and cooled, with the sheet still in the mold, either naturally or by forced convection, by blowing air or gas on the mold. In this method of the prior art, the tooling is exposed to high temperature for a significant time. Such exposure of the tooling to high temperature damages the tooling, especially by oxidation or chemical interaction with the formed glass, more particularly on the forming surface of the tooling, with which the sheet of glass is in contact during the forming operation. Even minimum damage to this surface can be transferred to the glass, leading to unacceptable surface defects. The use of refractory material that resists corrosion at high temperatures, such as nickel-based superalloy, makes it difficult to heat the die by radiation.

In order to avoid those drawbacks, the solutions of the prior art consist in forming the glass at a lower temperature, so that firstly, the tooling is less exposed to thermal-chemical damage phenomena and secondly the surface of the glass is sufficiently hard to not reproduce the surface defects.

However, this solution requires greater forming force, and the use of an effector or the application of gas pressure, which makes the tooling more complex and more expensive.

The document WO 2012/118612 describes a method for thermoforming a sheet of glass wherein said sheet is placed on tooling made of inert material vis-à-vis glass that is resistant to high temperature, such as graphite.

The sheet of glass and the tooling are placed under a vacuum bell comprising infrared heating means that heat the sheet of glass and the tooling by radiation. Such heating is carried out under inert atmosphere to keep the graphite from oxidizing. Forming is carried out by the combined application of vacuum under the sheet of glass and hot gas pressure on the other side.

These devices of the prior art involve long cycle times, and delicate control of thermal cycles, while heating and cooling alike. Further, these methods of the prior art use enclosures or special equipment where production is concentrated, and which are critical for productivity.

OBJECT AND SUMMARY OF THE INVENTION

The invention aims to remedy the drawbacks of the prior art and therefore relates to tooling for forming a sheet of glass comprising:
 a. a forming die made of metal that resists high temperature and comprises:
  ai. a molding surface
  aii. means suitable for holding a sheet of glass away from and opposite the molding surface;
  aiii. an induction circuit comprising an inductor extending in a cavity in the forming die
 b. a heating unit distant from the forming die and comprising:
  bi. a surface suitable for producing thermal radiation opposite the molding surface;
  bii. an induction circuit comprising an inductor extending in a cavity of said heating unit
 c. means to connect the two induction circuits to a high-frequency current generator.

Thus, the induction heating of the heating unit and the tooling makes it possible to rapidly raise the temperature of the tooling to the temperature required for forming glass, and thus prevent the tooling from being exposed to high temperature for a long period of time. The direct heating of the heating unit and the die makes it possible to control their temperature. The use of metal for the die makes it possible to machine the molding surface to achieve a suitable surface condition. Heating of the totality of the heating unit and the die makes it possible to evenly distribute the temperature over the entire surface of the formed sheet of glass. The tooling is suitable for operating as independent tooling and only needs to be connected to a high-frequency current generator.

The invention can be implemented advantageously in the embodiments described below, which may be considered individually or in any technically operative combination.

In one embodiment, the die is made of martensitic stainless steel. This type of steel is ferromagnetic up to a temperature of approximately 700° C. The high magnetic permeability in the ferromagnetic state makes it possible to rapidly heat the edges of the cavities in which the inductors extend by concentrating the field lines. The transmission of heat by conduction to the molding surface makes it possible to even out the temperature at its surface.

In another embodiment, the die is made of an alloy made of nickel (Ni), iron (Fe), chromium (Cr) and niobium (Nb). This type of nickel-based superalloy can resist creep and corrosion during prolonged exposure to temperature of 700° C. or even more in the case of short-term exposure. The material is electrically conductive and can be heated by induction.

In one alternative embodiment, the cavity in which the inductor extends comprises a layer made up of ferromagnetic material between the inductor and the walls of said cavity. The nickel-based alloy has low magnetic permeability, and so this embodiment makes it possible to concentrate heating on the edges of the cavity and then transfer the heat by conduction to the molding surface and thus achieve more efficient induction heating.

Advantageously, the heating unit is made of graphite. Graphite has a high emissivity coefficient in the thermal infrared range, is suitable for induction heating up to very high temperatures and is easy to machine. That technical solution allows the fast and even heating of the sheet of glass by radiation.

Advantageously, the graphite heating unit comprises coating that can resist oxidation at 1200° C. and with high emissivity in wavelengths between 3 μm and 50 μm. This embodiment makes it possible to protect the heating unit from oxidation and thus allows the tooling according to the invention to operate independently outside an enclosure.

In a particular embodiment, the tooling according to the invention comprises a containment enclosure around the die and the heating unit, wherein said enclosure is filled with neutral gas, particularly inert gas. Thus, the heating unit and the die are protected from oxidation and their life is increased. In the context of the invention, neutral gas is gas with composition that has no harmful effect in a certain context.

Advantageously, the die comprises a thermally insulating support that is suitable for separating the sheet of glass from contact with the die. Thus, the sheet of glass is protected from possible thermal shocks by contact with the die before said sheet of glass has reached its forming temperature.

Advantageously, the tooling according to the invention comprises:
d. a pyrometric sensor for measuring the temperature of the heating unit.

Advantageously, the tooling according to the invention also comprises:
e. a thermocouple integrated in the die and near the molding surface to measure the temperature of said molding surface.

These measuring devices make it possible to control and closely regulate the thermal cycle for thermoforming the sheet of glass.

Advantageously, the die in the tooling according to the invention comprises:
aiv. a cooling conduit for the circulation of a gas.

Advantageously, the heating unit of the tooling according to the invention comprises:
biii. a cooling conduit for the circulation of a gas.

These means contribute to the regulation of the thermal cycle for thermoforming and make it easier to manipulate the tooling, particularly the die, when the sheet of glass is loaded and the formed sheet is unloaded after the forming cycle.

The invention also relates to a method for thermoforming a sheet of glass that uses tooling according to any of the previous embodiments, which method comprises the steps of:
i. placing the sheet of glass on the die;
ii. simultaneously heating the die and the heating unit, by passing high-frequency electric current in their respective induction circuits.
iii. forming the sheet of glass to the shape of the molding surface of the die
iv. cooling the die at a controlled speed to the lower annealing temperature;
v. cooling the die
vi. removing the formed sheet of glass.

Thus, the method according to the invention allows strict control of the thermal forming cycle.

Advantageously, the step (ii) of the method according to the invention comprises heating the heating unit to a temperature known as the softening temperature of the glass making up the sheet of glass and heating the die to a temperature equal to the higher annealing temperature. Thus, the behavior of the sheet of glass is sufficiently plastic to allow gravity forming.

BRIEF DESCRIPTION OF THE DRAWINGS

The invention is described below in its preferred embodiments, which are not limitative in any way, and by reference to FIGS. 1 to 3, wherein.

DETAILED DESCRIPTION OF THE EMBODIMENTS

Throughout the document, unless otherwise specified:
the glass softening temperature is the temperature at which the viscosity of the formed glass is $10^7$ poises ($10^6$ Pa·s);
the higher annealing temperature is the temperature at which the viscosity of the formed glass is $10^{13}$ poises ($10^{12}$ Pa·s); and
the lower annealing temperature is the temperature at which the viscosity of the formed glass is $10^{14}$ poises ($10^{13}$ Pa·s).

Figure 1:
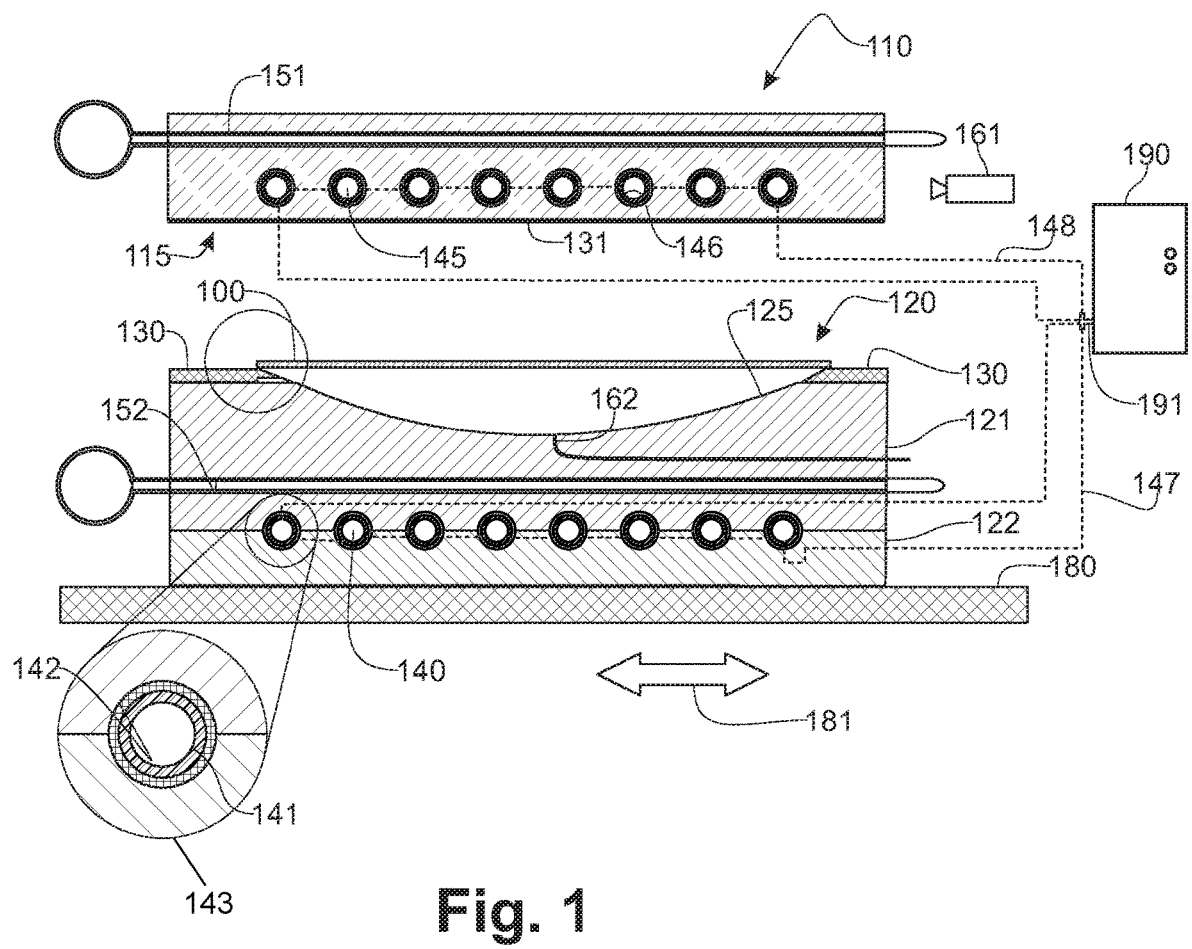
FIG. 1 is a sectional view of an exemplary embodiment of the tooling according to the invention, before the forming of a sheet of glass, which sheet is positioned on the tool.

In FIG. 1 of an exemplary embodiment, the tooling according to the invention comprises a heating unit (110) and a forming die (120) comprises a molding surface (125). In this exemplary embodiment, the molding surface (125) is recessed. Alternatively, the molding surface is raised.

The tooling according to the invention is represented here at the start of the forming operation, where the sheet of glass (100) that is initially flat in this exemplary implementation is placed above the cavity (125) and rests on its ends on thermally insulating pads (130). As a non-limitative example, said pads (130) are made of ceramic or composite material comprising 90% or more mica (muscovite) in a silicone matrix. In an exemplary embodiment, the die (120) is made of a nickel-based structural hardening superalloy known commercially as Inconel 718 ®, comprising 17 to 21% chromium (Cr), 2.8 to 3.3% molybdenum (Mo), 4.75 to 5.5% niobium (Nb), 17 to 19% iron (Fe) and 50 to 55% nickel (Ni). Alternatively, the die is made of ferrite martensitic stainless steel of the AISI 431 type comprising 0.16% carbon (C), 2% nickel (Ni) and 17% chromium (Cr). These materials have certain mechanical properties, particularly wear and creep resistance and corrosion resistance at high temperature up to 400° C. for stainless steel and up to 700° C. for Inconel 718 ®, and higher with short-term exposure. The die comprises a plurality of conduits (140) containing inductors that make up an induction circuit (147). Said inductors may for instance be made of a copper tube (141) insulated from the walls (143) of the conduits by a ceramic tube (142), for example a silica sleeve. Advantageously, the die (120) is made of two parts (121, 122); thus, the conduits (140) for passing the inductors are made by grooving said parts before they are assembled.

Figure 2:
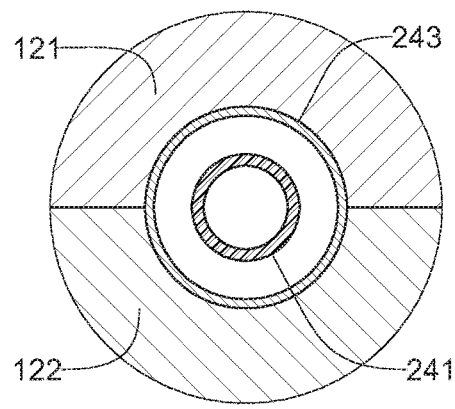
FIG. 2 is a detailed view of the same section as in FIG. 1 showing an exemplary embodiment of an induction circuit in the die of the tooling according to the invention.

In FIG. 2 of another embodiment of the induction circuit, which is more particularly adapted to cases where the material making up the die is not ferromagnetic, the conduits are jacketed with a layer (243) of steel with high magnetic permeability that retains its ferromagnetic properties up to high temperature, for instance 700° C. Thus, the magnetic field produced by the inductor (241) is concentrated in the jacketing (243), which is heated rapidly and that heat is transmitted to the die by conduction. The heat is transmitted by conduction up to the molding surface, and the judicious arrangement of inductors makes it possible to even out the temperature on this molding surface.

Returning to FIG. 1, in this exemplary embodiment, a network of cooling conduits (152) is arranged in the die (120) by drilling or grooving and assembly, as with the conduits accommodating the inductors. These conduits make it possible to blow air or a neutral heat-transfer gas to cool the die and particularly the molding surface. The blowing of air and induction heating may be used jointly for regulating the temperature or the cooling speed. A thermocouple (162) is advantageously placed near the molding surface (125) in order to measure its temperature and to control the conditions of heating and cooling. The die is placed on a thermally insulating support (180), such as a composite plate made of zirconia or a plate made of composite material comprising mica (muscovite) and a silicone binder. In an exemplary embodiment, said support (180) is mounted on means (not shown) that make it possible to displace the die (181) relative to the heating unit (110) in order to facilitate the operations for loading and unloading the sheet of glass in the tooling.

The heating unit (110) is made of graphite. It is held at a distance from the die by means (not shown) for adjusting the distance between the emissive surface (115) opposite the molding surface (125) of the die, and the sheet of glass (100), typically within a range between 5 mm and 50 mm.

Like the die (120), said heating unit (110) comprises, in this exemplary embodiment, a network of conduits (145) containing tubular inductors (146) that make up an induction heating circuit (148) and a network of cooling conduits (151) in which heat-transfer gas circulates. In one exemplary embodiment, the heating unit comprises, on all or some of its sides, coating (131) suitable for protecting the graphite from oxidation at high temperature and with high emissivity in the thermal infrared radiation band, for example a coating of silicon carbide (SiC). Such coating makes it possible to protect the graphite from oxidation up to a temperature of approximately 1600° C. Thus, the tooling according to the invention is suitable for operating in air without damage. Alternatively, to extend the life of the tooling according to the invention, it is placed in an enclosure, which enclosure is filled with gas that is neutral at the operating temperature, such as argon or nitrogen, or inert gas such as helium. The temperature of the heating unit is measured in this exemplary embodiment by an infrared pyrometer (161).

The induction circuits (148, 147) of the heating unit (110) and the die (120) of the tooling according to the invention are connected by a connector (191) to a high-frequency current generator (190), typically operating at a frequency between 10 kHz and 200 kHz through means (not shown) suitable for tuning the resulting resonant circuit, particularly a set of capacitors and an impedance adapting coil.

Figure 3:
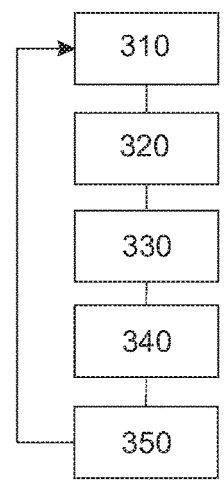
FIG. 3 is a chart illustrating the method according to the invention.

In FIG. 3, according to an exemplary embodiment of the method according to the invention, the method comprises a first loading step (310) consisting in placing the sheet of glass to form on the tooling. In a particular embodiment, this step (310) is carried out when the die is at a distance from the heating unit. In alternative embodiments, said sheet of glass is placed at ambient temperature on a die at ambient temperature or a die at temperature equal to or below the lower annealing temperature of the glass. In another embodiment, in an inline process, the sheet of glass is placed on the die at a temperature below or equal to the lower glass annealing temperature, or temperature below 600° C. The sheet of glass rests on insulating pads just above the molding surface, without touching it. In a heating step (320), the die bearing the sheet of glass is under the heating unit, and said heating unit and the die are heated by induction. The heating unit is heated to a temperature at least equal to the softening temperature of the glass, or 800° C. to 850° C. depending on the type of glass or a higher temperature that commonly ranges between 1200° C. and 1600° C. in the case of a graphite unit, so as to increase the radiation power. The die is heated to a lower temperature, typically to the higher annealing temperature of the glass, or between 600° C. to 700° C. depending on the nature of the glass being thermoformed. The sheet of glass is heated by radiation from the heating unit. During a forming step (330), by softening due to heating, the sheet of glass creeps on the molding surface of the die, and follows its shape. It cools when it comes in contact with the die, but the temperature remains sufficient to relax the stresses in the sheet of glass. During a cooling step (340), in an exemplary embodiment, the heating of the heating unit is stopped and said unit is cooled by the gas circulating in the cooling conduits. The cooling of the sheet of glass is regulated by the die. Thus, the cooling step (340) comprises slow and controlled cooling to the lower annealing temperature of the glass making up the sheet, typically between 500° C. and 600° C. depending on the type of the glass, then cooling is accelerated up to the unloading temperature. When the unloading temperature is reached, in an unloading step (350), the die is moved to the unloading position in an exemplary embodiment and the formed sheet of glass is removed from the die using appropriate means, such as a suction pad device. The tool is now ready for a new cycle.

The description above and the exemplary embodiments show that the invention achieves its set objectives; in particular, it reduces the time for which the tooling is kept at high temperature, at the same time allowing close control over the thermal cycle for thermoforming. The tooling according to the invention is suitable, in a particular embodiment, for operating independently with no particular enclosure.

The invention claimed is:

1. A tooling to form a sheet of glass, comprising:
a forming die made of electrically conductive material, the forming die comprising:

a molding surface; and a plurality of first conduits, each first conduit comprises a copper tube insulated from a wall of said each first conduit by a ceramic sleeve, the copper tube of said each first conduit being connected to a high-frequency generator to make up a first induction circuit;

the forming die further comprising, between the plurality of first conduits and the molding surface, a network of cooling conduits to circulate a gas;

a heating unit made of graphite distant by 5 to 50 mm from the forming die, the heating unit comprising:

a surface configured to produce a thermal radiation opposite the molding surface comprising a coating configured to resist oxidation at 1200° C. and with an emissivity in wavelengths between 3 µm and 50 µm; and a plurality of second conduits, each second conduit comprises a copper tube insulated from a wall of said each second conduit by a ceramic sleeve, the copper tube of said each second conduit being connected to the high-frequency generator to make up a second induction circuit;

a connector to connect the first induction circuit and the second induction circuit to the high-frequency current generator; and a support between the die and the sheet of glass configured to hold the sheet of glass away from and opposite the molding surface when the heating unit is heating the sheet of glass.

2. The tooling according to claim 1, wherein the forming die is made of martensitic stainless steel.

3. The tooling according to claim 1, wherein the forming die is made of an alloy made of nickel (Ni), iron (Fe), chromium (Cr) and niobium (Nb).

4. The tooling according to claim 1, further comprising a containment enclosure around the forming die and the heating unit, wherein the containment enclosure is filled with a neutral gas.

5. The tooling according to claim 4, wherein the neutral gas is an inert gas.

6. The tooling according to claim 1, wherein the support is a thermally insulating support.

7. The tooling according to claim 1, wherein the support is thermally insulating pads.

8. The tooling according to claim 1, further comprising a pyrometric sensor configured to measure a temperature of the heating unit.

9. The tooling according to claim 1, further comprising a thermocouple integrated in the forming die and in proximity to the molding surface to measure a temperature of the molding surface.

10. The tooling according to claim 1, wherein the heating unit further comprises a network of cooling conduits to circulate a gas.

11. A method for thermoforming a sheet of glass utilizing the tooling according to claim 1, comprising the steps of:

placing the sheet of glass on the forming die;

simultaneously heating the forming die and the heating unit, by passing a high-frequency electric current in their respective induction circuits;

forming the sheet of glass to a shape of the molding surface of the forming die;

cooling the forming die at a controlled speed to a lower annealing temperature, a temperature at which a viscosity of a formed glass is $10^{14}$ poises ($10^{13}$ Pa·s);

cooling the forming die; and removing the formed sheet of glass.

12. The method according to claim 11, wherein the step of simultaneously heating comprises heating the heating unit to a softening temperature of the formed glass making up the formed sheet of glass, a temperature at which the viscosity of the formed glass is $10^7$ poises ($10^6$ Pa·s); and heating the forming die to a temperature equal to a higher annealing temperature, a temperature at which a viscosity of the formed glass is $10^{13}$ poises ($10^{12}$ Pa·s).

* * * * *